United States Patent
Chisu et al.

(10) Patent No.: US 12,001,220 B2
(45) Date of Patent: Jun. 4, 2024

(54) MOBILE DEVICE NAVIGATION TO A LOCATION HAVING COMMUNICATION ACCESS TO OR CONNECTIVITY WITH A WIRELESS NETWORK

(71) Applicant: MOTOROLA MOBILITY LLC, Wilmington, DE (US)

(72) Inventors: Daniel C Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 238 days.

(21) Appl. No.: 17/495,057

(22) Filed: Oct. 6, 2021

(65) Prior Publication Data
US 2023/0106925 A1   Apr. 6, 2023

(51) Int. Cl.
*G01C 21/34* (2006.01)
*G05D 1/00* (2006.01)
*H04W 4/024* (2018.01)

(52) U.S. Cl.
CPC ....... *G05D 1/0278* (2013.01); *G01C 21/3415* (2013.01); *G01C 21/3453* (2013.01);
(Continued)

(58) Field of Classification Search
CPC ............ G01C 21/3415; G01C 21/3423; G01C 21/3453; G05D 1/0278; G05D 1/0022; G05D 1/0285; H04W 4/024
See application file for complete search history.

(56) References Cited

U.S. PATENT DOCUMENTS 9,927,247 B2* 3/2018 Ding ................ G08G 1/096833
2005/0055159 A1* 3/2005 Song .................. G01C 21/3629
340/995.19
(Continued)

FOREIGN PATENT DOCUMENTS

CN   107105409 A  *  8/2017  ........... G01C 21/343
CN   110864682    *  6/2020  ........... G01C 21/005
(Continued)

OTHER PUBLICATIONS

Apple iPhone User Guide Webpage—"Learn the meaning of the iPhone status icons", Feb. 24, 2020, Apple, http://web.archive.org/web/20200224135354/https://support.apple.com/guide/iphone/learn-the-meaning-of-the-status-icons-iphef7bb57dc/ios.*

*Primary Examiner* — Abby Y Lin
*Assistant Examiner* — Benjamin J Brosh
(74) *Attorney, Agent, or Firm* — Isidore PLLC (57) ABSTRACT

A method, a communication device and a computer program product for navigating to a location with communications to a wireless network. The method includes detecting, via a processor of a communication device, a loss of a first communication signal from a wireless network and receiving signal loss location data corresponding to a first location where the first communication signal from the wireless network was lost. The method further includes retrieving, from a memory of the communication device, first navigation data corresponding to a first route between a starting location and an end location. The method further includes generating and presenting, on an output device of the communication device, second navigation data based on the first navigation data and the signal loss location data. The second navigation data corresponds to a second route between a current location and the first location where communications to the wireless network are available.

20 Claims, 7 Drawing Sheets

(52) U.S. Cl.
CPC ......... *G05D 1/0022* (2013.01); *G05D 1/0285* (2013.01); *H04W 4/024* (2018.02)

(56) References Cited

U.S. PATENT DOCUMENTS

| | | | | |
|---|---|---|---|---|
| 2006/0074555 A1* | 4/2006 | Liu | ........................ | G08G 1/205 |
| | | | | 701/428 |
| 2011/0029229 A1* | 2/2011 | Hui | ........................ | H04W 4/18 |
| | | | | 701/533 |
| 2013/0204465 A1* | 8/2013 | Phillips | ................ | G05D 1/0278 |
| | | | | 701/2 |
| 2015/0253142 A1* | 9/2015 | Kornhauser | ........... | G01C 21/34 |
| | | | | 701/408 |
| 2016/0313734 A1* | 10/2016 | Enke | ...................... | G01C 21/34 |
| | | | | 701/408 |
| 2022/0197292 A1* | 6/2022 | Miller | ................. | G05D 1/0022 |

FOREIGN PATENT DOCUMENTS

| | | | | | |
|---|---|---|---|---|---|
| CN | 112033390 | A | * | 12/2020 | ........... G01C 21/005 |
| CN | 112804636 | A | * | 5/2021 | ............. G01C 21/00 |
| GB | 2381112 | A | * | 4/2003 | ......... G01C 21/3415 |
| KR | 100719318 | B1 | * | 11/2005 | ........... G08G 1/0962 |
| KR | 20090046009 | | * | 5/2009 | ............. G06Q 50/30 |
| WO | WO-2009141487 | A1 | * | 11/2009 | ............. G01C 21/20 |

\* cited by examiner

MOBILE DEVICE NAVIGATION TO A LOCATION HAVING COMMUNICATION ACCESS TO OR CONNECTIVITY WITH A WIRELESS NETWORK

BACKGROUND

1. Technical Field

The present disclosure generally relates to mobile devices and in particular to mobile device navigation to a location having wireless communication service.

2. Description of the Related Art

Mobile communication devices, such as cell phones, are widely used for voice communication and data transmission. Mobile communication devices are also used to provide navigation services using various map applications. Mobile communication devices communicate with a wireless network through a series of cell towers or sites that contain antennas to send and receive signals from the mobile communications device. Not all geographic areas have communication coverage of a cell site, and thus, the mobile communication device may travel outside of a wireless network coverage area and lose communications with the cell site. When the device user is also the driver, an amount of time may elapse before the user realizes that cellular communication service is lost, and the user of the mobile communication device may not know how to travel to a location that has cellular communication service.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to one aspect of the disclosure, the illustrative embodiments provide a method, a communication device, and a computer program product for navigating to a location with device-accessible cellular/WiFi communication service to a wireless network. In a first embodiment, the method includes detecting, via a processor of a wireless communication device, a loss of a first communication signal from a wireless network and receiving/generating signal loss location data corresponding to a first location where the first communication signal from the wireless network was lost (i.e., no longer detected by or providing communication access by the mobile device to the wireless network). The method further includes retrieving, from memory within the communication device, first navigation data corresponding to a first route between a starting location and an end location along a path being travelled by a user of the communication device. The method further includes generating and presenting, on an output device of the communication device, second navigation data generated based on the first navigation data and the signal loss location data. The second navigation data corresponds to a second route between a current location and the first location where communication access to the wireless network is available.

According to another embodiment, a communication device includes a global positioning system device, a display, and memory having stored thereon a map module and a "return to service" module for navigating to a location with device-accessible cellular/WiFi communication service to a wireless network. One or more processors are communicatively coupled to the global positioning system device, the display, and the memory. The one or more processors execute program code of the map module and the return to service module, which enables the communication device to detect a loss of a first communication signal from the wireless network and to receive/generate signal loss location data. The signal loss location data corresponds to a first location where the first communication signal from the wireless network was lost (i.e., no longer detected by or providing communication access by the mobile device to the wireless network). The program code further enables the communication device to retrieve, from the memory, first navigation data corresponding to a first route between a starting location and an end location along a path being travelled by a user of the communication device. The program code further enables the communication device to generate and present second navigation data, generated based on the first navigation data and the signal loss location data. The second navigation data corresponds to a second route between a current location of the communication device and the first location where communication access to the wireless network is available.

According to an additional embodiment, a computer program product includes a computer readable storage device having stored thereon program code which, when executed by one or more processors of a communication device having a global positioning system device, a display and memory enables the communication device to complete the functionality of detecting a loss of a first communication signal from a wireless network. The computer program product further enables the communication device to receive/generate signal loss location data corresponding to a first location where the first communication signal from the wireless network was lost (i.e., no longer detected by or providing communication access by the mobile device to the wireless network) and to retrieve, from the memory, first navigation data corresponding to a first route between a starting location and an end location along a path being travelled by a user of the communication device. The computer program product further enables the communication device to generate and present second navigation data generated based on the first navigation data and the signal loss location data. The second navigation data corresponds to a second route between a current location and the first location where communication access to the wireless network is available.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile communication device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
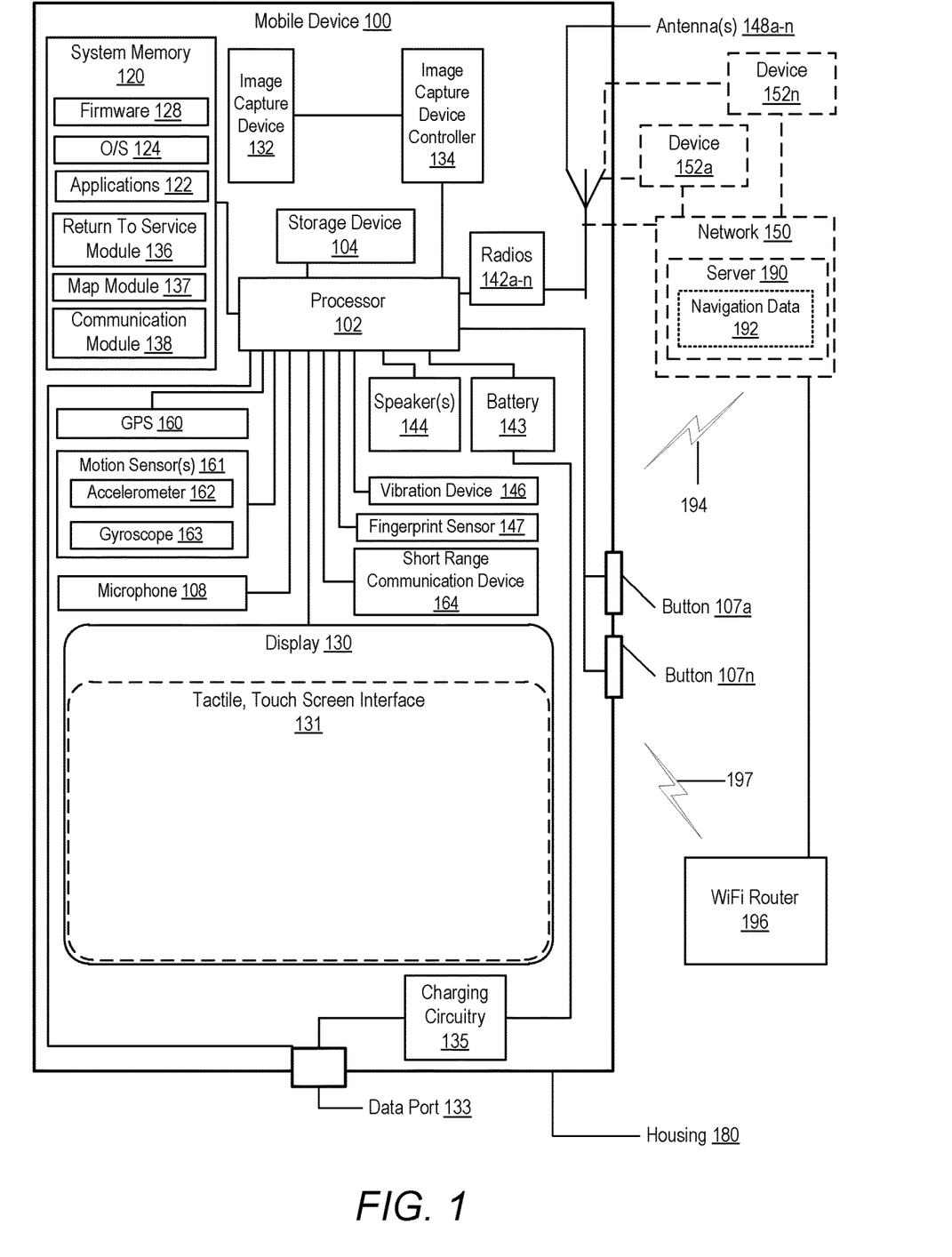
FIG. 1 depicts an example mobile device within which various aspects of the disclosure can be implemented, according to one or more embodiments.

FIG. 1 depicts an example communication device 100 within which various aspects of the disclosure can be implemented, according to one or more embodiments. Examples of such communication devices include, but are not limited to, a notebook computer, a mobile phone, a digital camera, a smart watch, and a tablet computer, etc. For purposes of the described embodiments, communication device 100 shall be described as mobile device 100. Mobile device 100 includes processor 102, which is communicatively coupled to storage device 104, system memory 120, an output device such as display 130, and image capture device (ICD) controller 134. Processor 102 can include processor resources such as a central processing unit (CPU) that support computing, classifying, processing and transmitting of data and information.

System memory 120 may be a combination of volatile and non-volatile memory, such as random access memory (RAM) and read-only memory (ROM). System memory 120 can store program code or similar data associated with firmware 128, an operating system (O/S) 124, applications 122, return to service module 136, map module 137, and communication module 138. Return to service module 136 includes program code that is executed by processor 102 to enable mobile device 100 to navigate back to a location that has communication access by mobile device 100 or a second device to a wireless network. Map module 137 includes program code that is executed by processor 102 to enable mobile device 100 to display maps and directions to navigate to geographic locations. Communication module 138 includes program code that is executed by processor 102 to enable mobile device 100 to communicate with other external devices and systems.

Although depicted as being separate from applications 122, return to service module 136, map module 137, and communication module 138 may also be each implemented as an application. Processor 102 loads and executes program code stored in system memory 120. Examples of program code that may be loaded and executed by processor 102 include program code associated with applications 122 and program code associated with return to service module 136, map module 137, and communication module 138.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or control mobile device 100 by touching features presented within/below the display screen.

Image capture device 132 is communicatively coupled to ICD controller 134, which is communicatively coupled to processor 102. ICD controller 134 supports the processing of signals from image capture device 132. Image capture device 132 can capture images that are within the field of view of image capture device 132.

Mobile device 100 can further include data port 133, charging circuitry 135, and battery 143. Mobile device 100 further includes microphone 108, one or more output devices such as speakers 144, and one or more input buttons 107a-n. Input buttons 107a-n may provide controls for volume, power, and image capture device 132.

Mobile device 100 further includes radios 142a-n, which are coupled to antennas 148a-n. In this implementation, radios 142a-n and antennas 148a-n allow mobile device 100 to communicate wirelessly with other communication network devices 152a-n via one or more communication signals 194 to wireless network 150. In one embodiment, communication network devices 152a-n can be cellular sites or base stations that contain electronic communication equipment to allow communication with mobile device 100. Wireless network 150 is communicatively coupled to wireless fidelity (WiFi) router 196. WiFi router 196 can also allow mobile device 100 to communicate wirelessly with wireless network 150 via communication signals 197. In one embodiment, wireless network 150 can include a server 190 that provides navigation data 192. Mobile device 100 can receive navigation data 192 from wireless network 150. Navigation data 192 can include maps, routes, directions and other data.

Mobile device 100 further includes vibration device 146, fingerprint sensor 147, global positioning system (GPS) device 160, and motion sensor 161. Vibration device 146 can cause mobile device 100 to vibrate or shake when activated. Vibration device 146 can be activated during an incoming call or message in order to provide an alert or notification to a user of mobile device 100. According to one embodiment, vibration device 146 can be programmed to vibrate the device 100 whenever the mobile device 100 is no longer within a coverage area of a device-accessible wireless communication signal. According to one aspect of the disclosure, display 130, speakers 144, and vibration device 146 can collectively be referred to as output devices.

Fingerprint sensor 147 can be used to provide biometric data to identify or authenticate a user. GPS device 160 can provide time data and location data about the physical location of mobile device 100 using geospatial input received from GPS satellites.

Motion sensor(s) 161 can include one or more accelerometers 162 and gyroscope 163. Motion sensor(s) 161 can detect movement of mobile device 100 and provide motion data to processor 102 indicating the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100. Mobile device 100 further includes a housing 180 that contains/protects the components of the mobile device.

Mobile device 100 further includes short range communication device 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, mobile device 100 can receive internet or Wi-Fi based calls via short range communication device 164. In one embodiment, mobile device 100 can communicate with WiFi router 196 wirelessly via short range communication device 164.

In the description of each of the following figures, reference is also made to specific components illustrated within the preceding figure(s).

Figure 2:
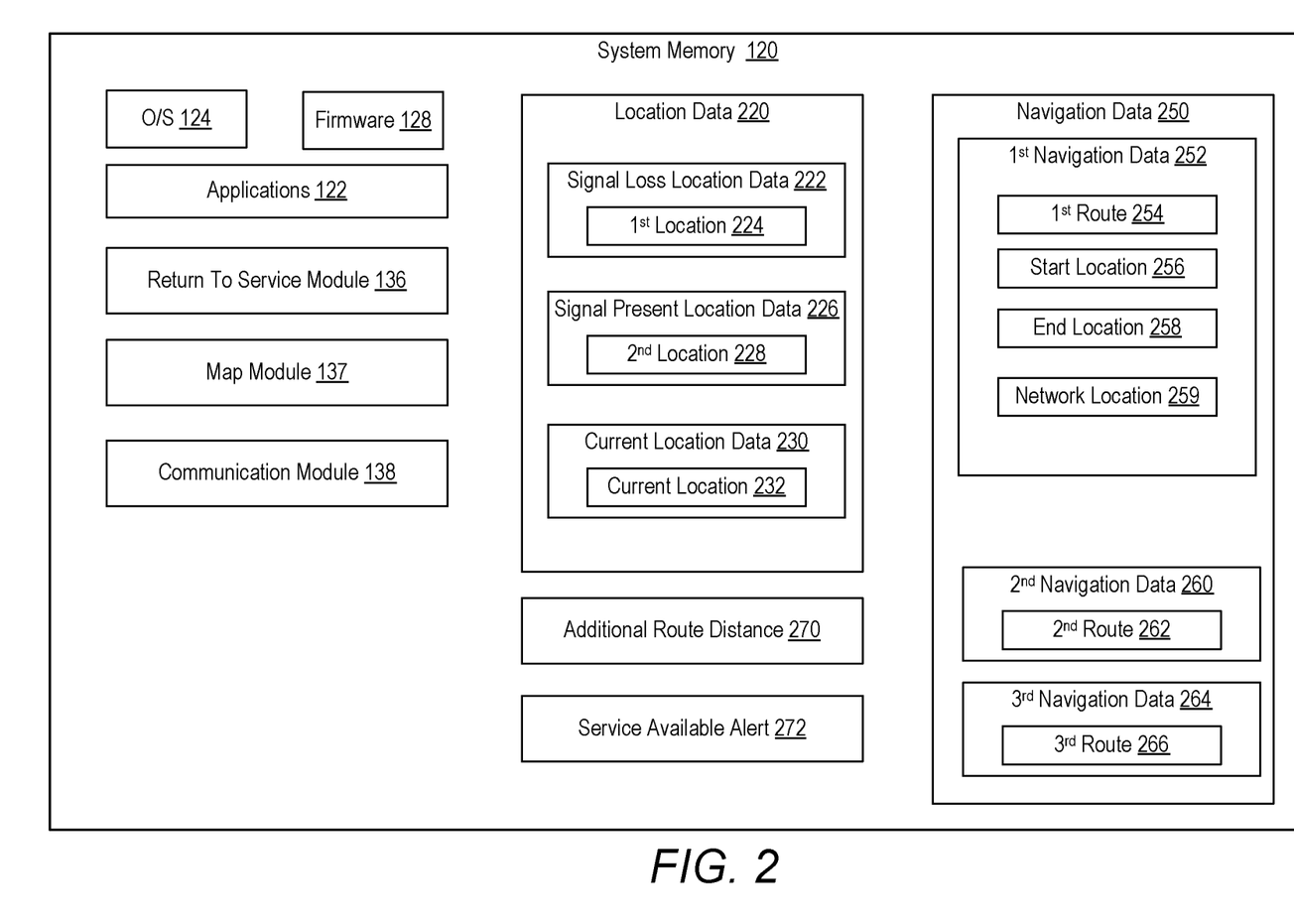
FIG. 2 is a block diagram of example contents of the system memory of the example mobile device of FIG. 1, according to one or more embodiments.

Referring to FIG. 2, one embodiment of example contents of system memory 120 of mobile device 100 is shown. System memory 120 includes data, software, and/or firmware modules, including applications 122, operating system 124, firmware 128, return to service module 136, map module 137, and communication module 138.

Return to service module 136 enables mobile device 100 to generate a route back to a known location that has device-accessible cellular/WiFi communication service to a network. After wireless communication service has been lost, return to service module 136 can enable mobile device 100 to present instructions and/or direction to enable the user and/or vehicle to navigate back to an area where device-accessible cellular/WiFi communication service was previously available.

Map module 137 enables mobile device 100 to display maps and directions to navigate to geographic locations. Map module 137 enables mobile device 100 to display various types of maps, such as road maps, satellite images, street view maps, and traffic condition maps. Map module 137 enables a user of mobile device 100 to plan routes and to receive navigation instructions from mobile device 100. Communication module 138 enables mobile device 100 to communicate with wireless network 150. Although depicted as being separate modules in system memory 120, the features and/or functions associated with return to service module 136 and map module 137 may also be combined into one module.

In one embodiment, return to service module 136 and map module 137 enables mobile device 100 to generate a route back to a location that has cellular communication service to a network and to navigate from the current location to the location that has cellular communication service to a network. In one embodiment, execution of return to service module 136 and map module 137 by processor 102 enables/configures mobile device 100 to perform the processes presented in the flowchart of FIGS. 5 and 6, as will be described below.

System memory 120 further includes location data 220. Location data 220 includes information about a geographic location on earth. Location data 220 can include various types of geographic coordinate information such as spherical location data (longitude, latitude and altitude), grid coordinate data (Universal Transverse Mercator (UTM) data) and three-dimensional Cartesian coordinate data. In one embodiment, at least some of location data 220 can be received from GPS device 160.

Location data 220 includes signal loss location data 222, signal present location data 226 and current location data 230. Signal loss location data 222 contains geographic information about a signal lost location or first location 224 where mobile device 100 losses communication signal 194 with wireless network 150. In other words, first location 224 is where the cellular coverage reception area ends. Signal loss location data 222 also includes the time that the communication signal was lost. Signal present location data 226 contains geographic information about a second location 228 where mobile device 100 can send and receive communication signals 194 from wireless network 150. In other words, second location 228 is in a cellular coverage reception area. Current location data 230 contains geographic information about the current location 232 of mobile device 100.

System memory 120 further includes navigation data 250. Navigation data 250 includes various types of navigation data such as maps, routes, directions, and other data. Navigation data 250 includes first navigation data 252, second navigation data 260 and third navigation data 264. First navigation data 252 contains first route 254, start location 256, end location 258 and network location 259. First route 254 is between start location 256 and end location 258. Network location 259 corresponds to location where communication signals 194 from wireless network 150 were available or where mobile device 100 was in an area with cellular service. In one embodiment, wireless network 150 can determine network location 259 based on various geo-location techniques such as triangulation and trilateration between multiple cellular sites.

In one embodiment, start location 256 and end location 258 can be transmitted from mobile device 100 to server 190 via communication signals 194 and wireless network 150. Server 190 can generate navigation data 192 based at least partially on start location 256 and end location 258. Server 190 can transmit navigation data 192 to mobile device 100, via communication signals 194 and wireless network 150. The received navigation data 192 is stored as first navigation data 252 in system memory 120. Server 190 can periodically transmit network location 259 to mobile device 100 at regular intervals. Wireless network 150 can determine the location (i.e., network location 259) of mobile device 100 using various geo-location techniques and can transmit network location 259 to mobile device 100. In one example embodiment, server 190 can transmit network location 259 to mobile device 100 every minute.

Second navigation data 260 contains second route 262. Second route 262 is a course or direction between end location 258 and first location 224 where a loss of communication signal occurred. In one embodiment, second route 262 is at least partially a reverse of first route 254 that follows a previously travelled portion of first route 254. Third navigation data 264 contains third route 266. Third route 266 is a course or direction between end location 258 and second location 228 where communication signals 194 are present. In one embodiment, third route 266 is at least partially a reverse of first route 254 that follows a previously travelled portion of first route 254.

System memory 120 further includes additional route distance 270 and service available alert 272. Additional route distance 270 is a pre-determined distance that is added to first location 224 towards start location 256 along the reverse of first route 254. In one embodiment, second location 228 where communication signals 194 are present is at least partially determined by adding additional route distance 270 to first location 224 towards start location 256 along the reverse of first route 254. Second location 228 is between first location 224 and start location 256. In an example embodiment, additional route distance 270 can have values ranging between 50 feet and 5280 feet. According to one or more aspects, adding the additional route distance 270 back towards start location 256 ensures that second location 228 is within a cellular coverage area where communication signals 194 are present. Service available alert 272 is a visual/audio notification that mobile device 100 has re-entered a location having wireless communication service. Service available alert 272 can be provided on mobile device 100 in a visual format via display 130 or via an audio format via speakers 144.

Figure 3:
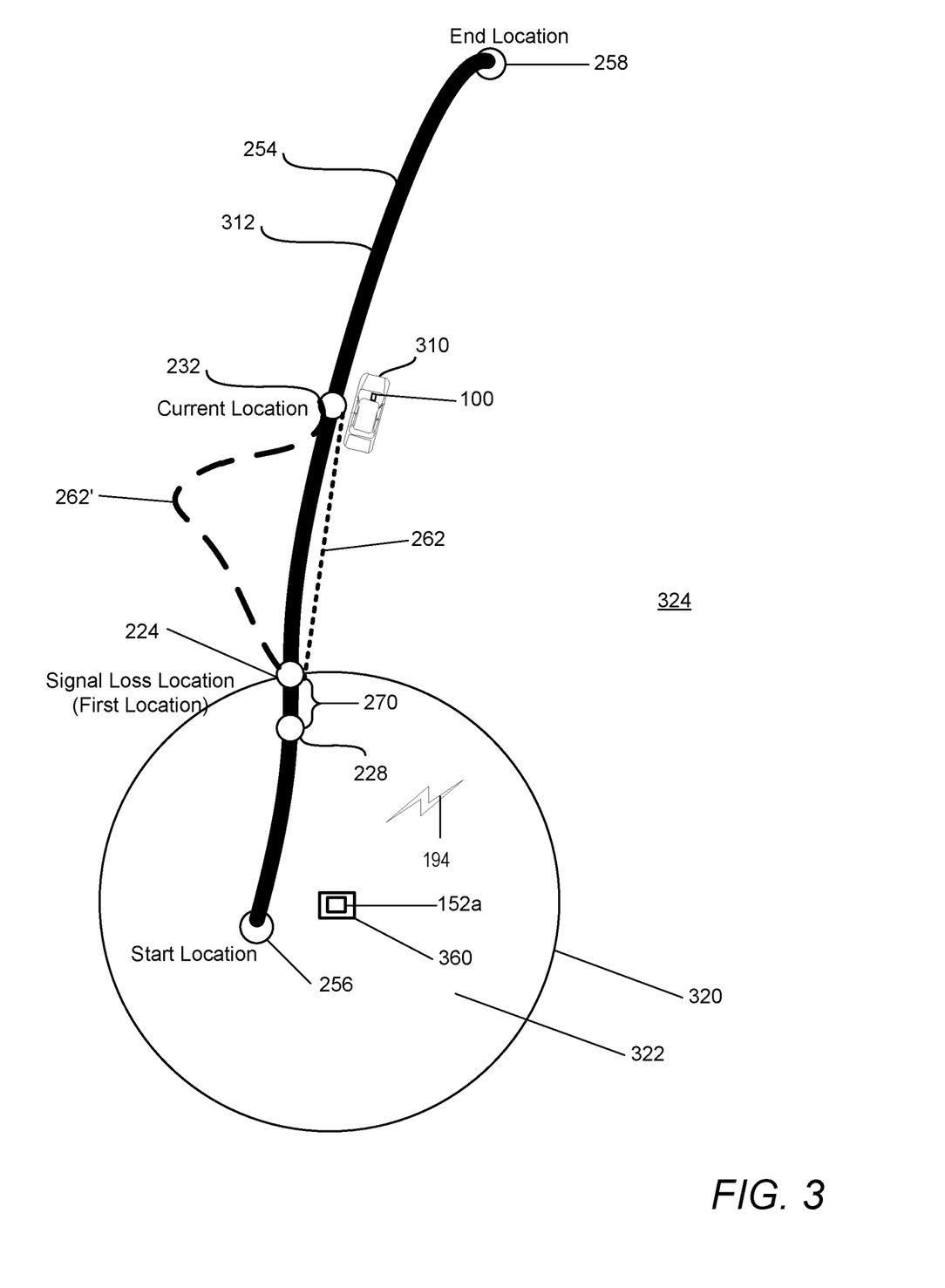
FIG. 3 is an example illustration of a navigation route within a geographic area having locations with and without wireless communication access, according to one or more embodiments.

FIG. 3 illustrates geographic areas with and without wireless communication access to wireless network 150 (FIG. 1). Mobile device 100 is located inside a vehicle 310 that is traveling on a road 312, along first route 254 between start location 256 and end location 258. Vehicle 310 and mobile device 100 are shown at current location 232. In one embodiment, mobile device 100 can use map module 137 to provide first navigation data 252 to a user. For example, mobile device 100 can show maps of first route 254 on display 130 and can provide audio directions of first route 254 via speaker 144.

A network communication device 152a, such as a cellular site or base station, or WiFi router 196 can transmit and receive communication signals 194 and/or 197 to and from mobile device 100. Communication signals 194 have a maximum range 320. Network communication device 152a is shown located at a cell tower 360. Maximum range 320 can vary depending upon terrain (i.e., hills and mountains), antenna height, and signal transmitter power. Areas that are within range 320 are within a wireless communication service (i.e., cellular or WiFi) coverage area 322. Areas outside of maximum range 320 represent null coverage area 324 (i.e., an area with no wireless communication service). Mobile device 100 can communicate with communication network device 152a when mobile device 100 is located in wireless communication service area 322. Mobile device 100 cannot communicate with communication network device 152a when mobile device 100 is located outside of wireless communication service area 322, i.e., in null coverage area 324. Mobile device 100 can communicate with wireless network 150 via at least one of network communication device 152a-n, such as a cellular site or base station, or via WiFi router 196. The specification will be described primarily from the perspective of mobile device 100 communicating with network communication devices 152a-n. When mobile device 100 is inside a moving vehicle, mobile device 100 will primarily be in communication with network communication devices 152a-n, such as a cellular site or base station. The features of the disclosure are also applicable to mobile device 100 communicating with wireless network 150 via WiFi communications through WiFi router 196, including larger municipal (e.g., city-wide) WiFi networks.

When mobile device 100 is inside vehicle 310 that travels outside of range 320 (i.e., outside of wireless communication service coverage area 322), mobile device 100 can detect a loss of communication signals 194 and trigger GPS device 160 to provide the location (i.e., signal loss location or first location 224) where communication signals 194 were lost. In one embodiment, when communication signals 194 are lost, radios 142a-n can contemporaneously provide information to processor 102 that communications have been lost with the cell site. Mobile device 100 can store first location 224 to system memory 120. First location 224 is shown between start location 256 and current location 232.

According to one aspect of the disclosure, the loss of communication signals 194 by mobile device 100 that is of relevance is not a temporary loss of communications (e.g., less than 5 seconds) with wireless network 150. In one embodiment, a temporary loss of communication signals 194 by mobile device 100 can be defined as a time period that does not cause mobile device 100 to display a "no service" indication on display 130. Rather, the loss of communication signals 194 by mobile device 100 that is of relevance to the disclosure is a longer duration event, which is severe enough to cause mobile device 100 to lose wireless communication service. In one embodiment, a loss of communication signals 194 by mobile device 100 for a predetermined threshold period of time can be designated as a loss of communication signals 194 with wireless network 150 that triggers the responsive features described herein. In one embodiment, the loss of communication signals 194 by mobile device 100 can be defined as a time period long enough to cause mobile device 100 to display a "no service" indication on display 130 such as for a home public land mobile network (HPLMN) loss. A "no service" indication can occur when mobile device 100 continuously fails to connect to the wireless network or when mobile device 100 fails to perform a tracking area update causing a non-access stratum (NAS) timer T3402 to be set. For example, when a "no service" indication is shown on display 130 then a loss of communication signals with wireless network 150 can be recorded to have occurred, and a location and time at which the loss first occurred is stored in device memory as the first location 224.

After wireless communication service has been lost, a user of mobile device 100 may desire to return to wireless communication service area 322. First location 224 provides mobile device 100 with the last location where communications were available with a wireless communication device. Mobile device 100 can use stored first location 224 to enable navigation from null coverage area 324 back into cellular service/coverage area 322. In one embodiment, mobile device 100 can reverse of a portion of first route 254 to navigate back from current device location into cellular service/coverage area 322, based at least partially on first location 224. Mobile device 100 can thus generate second route 262 from current location 232 to first location 224 where wireless communication service/coverage should be available and display the second route 262 on display 130. A user of mobile device 100 can follow second route 262 in order to return to cellular/WiFi service or coverage area 322. In one embodiment, second route 262 can be at least partially a reverse of first route 254. However, it is appreciated that in other embodiments, second route 262' can be a different route altogether, which is generated based on one or more route generating factors (e.g., least traffic, faster times, highway versus non-highway, etc).

In one or more embodiments, based on the stored first location 224, mobile device 100 can identify second location 228 located within cellular service/coverage area 322, where communication signals 194 are present. Mobile device 100 can calculate the position of second location 228 by adding additional route distance 270 to first location 224 along first route 254 towards start location 256. Alternatively, the calculation of second location 228 can be described as being performed by subtracting additional route distance 270 from first location 224 along first route 254. Second location 228 is identified between start location 256 and first location 224.

Because maximum range 320 of communication signal from cell tower 360 can vary slightly over time, communication signals 194 may not be present, at a later time, at a second location that is proximate to first location 224. For example, at a later time, maximum range 320 of communication signal could be 1000 feet less in diameter than when cellular service was lost at stored first location 224. Mobile device 100 can use pre-determined additional route distance 270 to calculate the position of second location 228. The value of additional route distance 270 is selected to ensure that second location 228 will be within wireless communication service or coverage area 322. Mobile device 100 can store second location 228 to system memory 120. In another embodiment, additional route distance 270 can have a range of values extending from the first location 224 back to the start location 256. In an additional embodiment, if communication signals 194 are still not available after mobile device 100 arrives at second location 228, mobile device 100 can generate an additional route back toward start location 256 and prompt a user to travel along the additional route toward start location 256 in order to regain wireless communication service. If communication signals 194 are still not available after mobile device 100 travels along the additional route back, mobile device 100 can display a notification of a failure to find service within proximity of second location 228 and display an icon to allow a user to exit navigation from the second location 228 and to return to navigation along first route 254 towards end location 258. Alternatively, mobile device 100 can display a notification of a failure to find service within proximity of second location 228 and display an icon to allow a user to exit navigation from the second location 228 and to return to navigation along first route 254 towards start location 256.

After cellular service has been lost, a user of mobile device 100 may desire to return to cellular service area 322. Second location 228 provides mobile device 100 with a location where communications should be present with a cell site. Mobile device 100 can use stored second location 228 to enable navigation from null coverage area 324 back into cellular/WiFi service coverage area 322. In one embodiment, mobile device 100 can generate a reverse of first route 254 to navigate back into cellular/WiFi service/coverage area 322, based at least partially on second location 228.

Figure 4A:
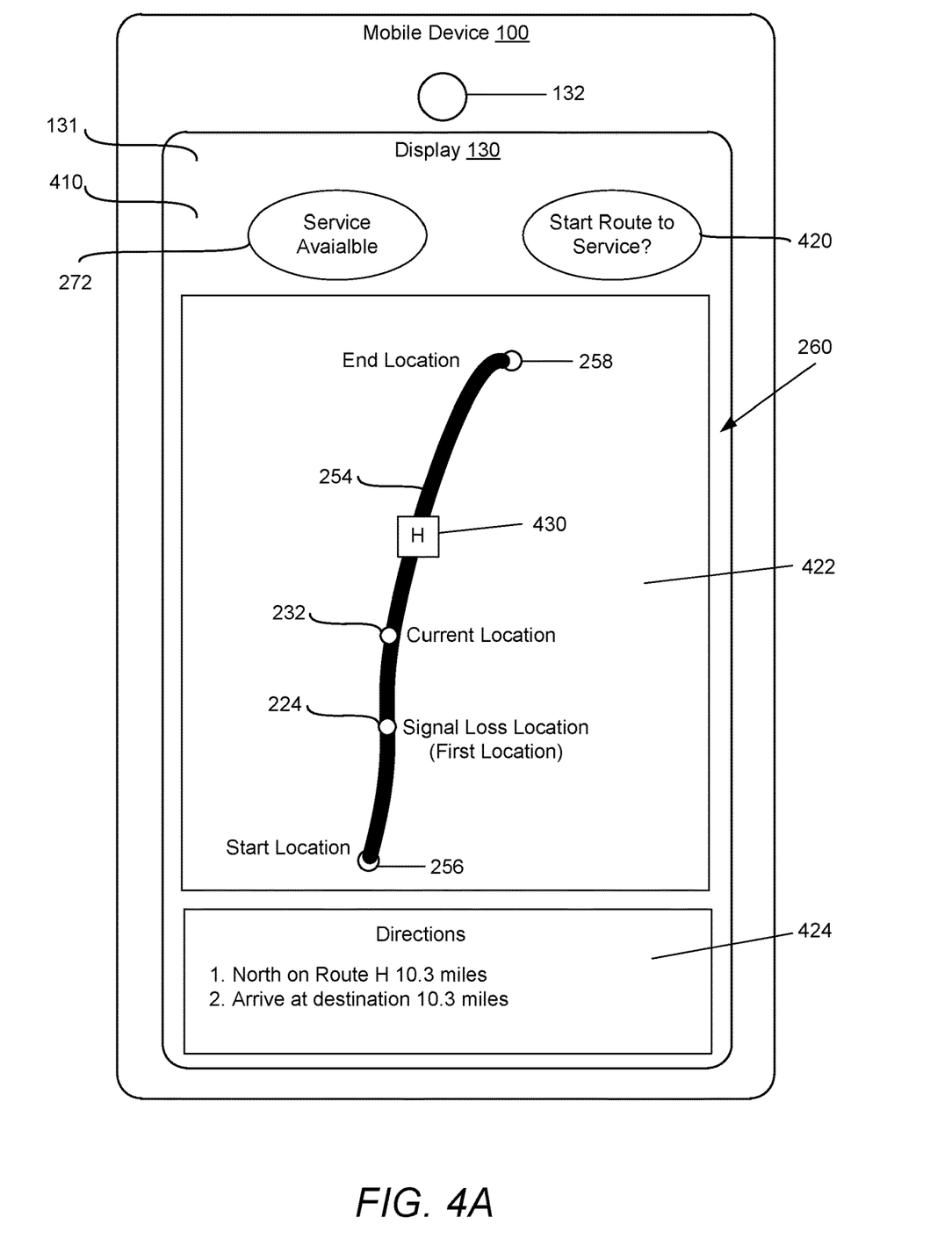
FIG. 4A is an example illustration of a mobile device displaying a "start route to cellular/wireless service" icon for navigating back to an area with device-accessible cellular/WiFi communication service, according to one or more embodiments.

FIG. 4A illustrates an example graphical user interface (GUI) 410 presented on display 130 of mobile device 100 after mobile device 100 has traveled outside of a wireless communication service area and communications signals have been lost. GUI 410 initially includes first navigation data 252, current location 232, and "Start Route to Service"

or "Return to Service" icon 420. Second navigation data 260 includes map 422 and directions 424. Map 422 includes first route 254 between start location 256 and end location 258. First route 254 is shown along road H 430. Directions 424 between start location 256 and end location 258 are presented on display 130. In one embodiment, directions 424 can also be presented in an audio format using speaker 144.

Map 422 further includes signal loss location or first location 224 and current location 232. After wireless communication service has been lost, mobile device 100 can automatically determine first location 224 and current location 232 and automatically display both first location 224 and current location 232 on map 422.

When selected by a user, e.g., via touch screen interface 131, "start route to service" icon 420 triggers mobile device 100 to generate and present a route back to a second location that is within the expected range of the cellular service coverage area. The user can then begin navigation back to a location where cellular service is available (i.e., second location 228). Service available alert 272 is a visual/audio notification that mobile device 100 has re-entered a location having wireless communication service. After wireless communication service has been lost and mobile device 100 travels or returns back into an area having wireless communication service, service available alert 272 is presented on GUI 410 to indicate to a user of mobile device 100 that wireless communication service is now available. Service available alert 272 can be provided on mobile device 100 in a visual format via display 130 or via an audio format via speakers 144.

Figure 4B:
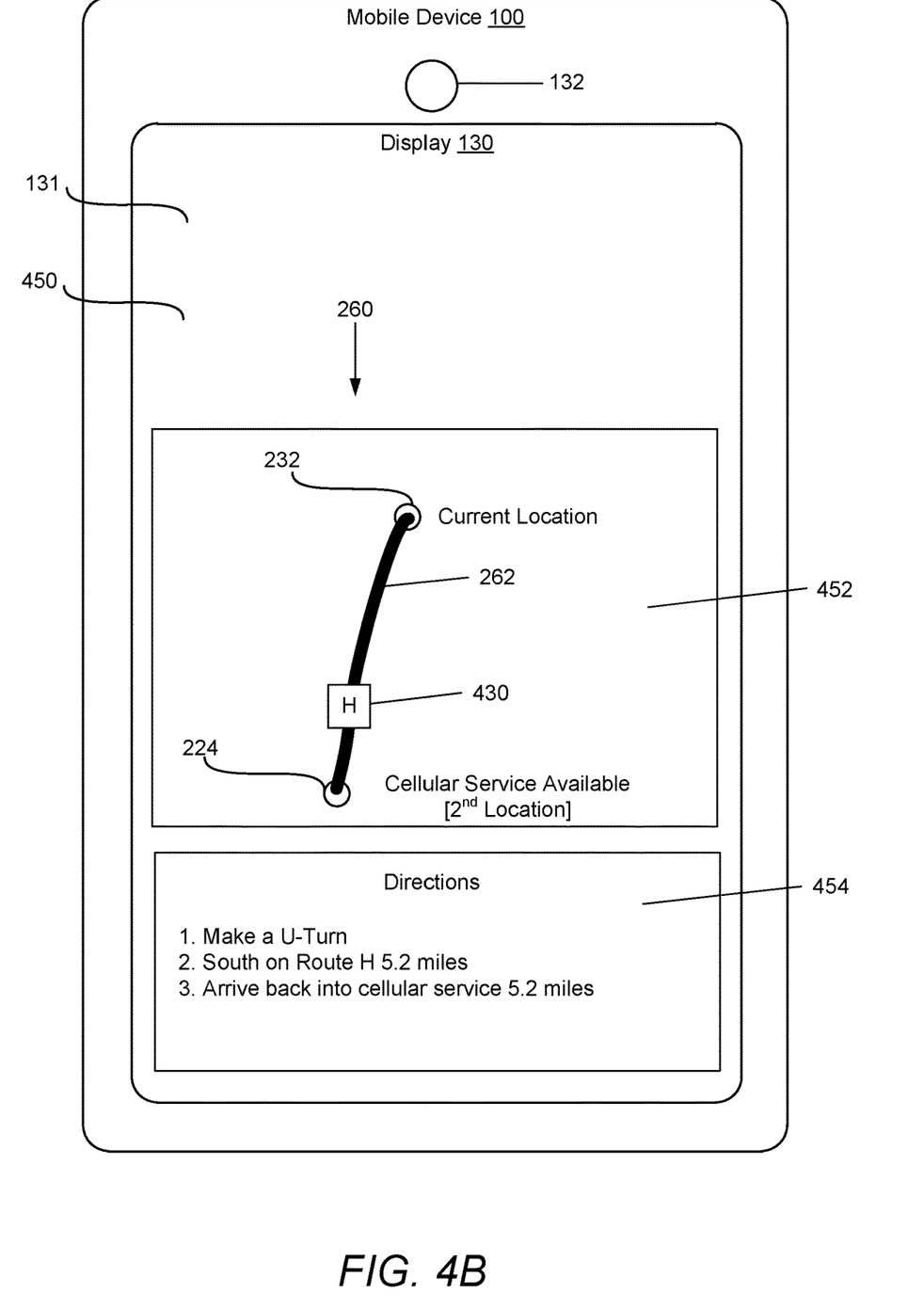
FIG. 4B is an example illustration of a mobile device automatically displaying a map and navigation directions back to an area with device-accessible cellular/WiFi communication service, according to one or more embodiments.

FIG. 4B illustrates an example graphical user interface (GUI) 450 presented on display 130 of mobile device 100 after a user has selected "start route to service" icon 420. After a user has selected "start route to service" icon 420, mobile device 100 can generate second navigation data 260 and present map 452 and directions 454 on display 130. GUI 450 includes second navigation data 260. Second navigation data 260 includes map 452 and directions 454. Map 452 is shown including second route 262. Second route 262 is a course or directions between current location 232 and first location 224 where cellular service was lost or was last available. In one embodiment, second route 262 is at least partially a reverse of first route 254 (FIG. 3). Second route 262 is shown along road H 430. Directions 454 between current location 232 and first location 224 are presented or shown on display 130. In one embodiment, directions 454 can also be presented in an audio format using speaker 144. As movement is detected, mobile device 100 further can begin navigation via second route 262 back to cellular/WiFi service inside of coverage area 322. Service available alert 272 (FIG. 4A) is displayed on GUI 450 of mobile device 100 when mobile device 100 reaches the coverage area 322.

According to one aspect of the disclosure, the generation of second navigation data 260 and the navigation along second route 262 can be performed by mobile device 100 automatically without input by a user. The loss of communication signals 194 to wireless network 150 can automatically trigger mobile device 100 to generate second navigation data 260 and initiate navigation along second route 262 back to cellular/WiFi service at first location 224. In an embodiment, when mobile device 100 detects the loss of communication signals, mobile device 100 can automatically initiate generating second navigation data 260 and present map 452 and directions 454 on display 130. Mobile device 100 further can automatically initiate navigation along second route 262 back to wireless communication service at first location 224.

According to another aspect of the disclosure, after detecting the loss of communication signals, mobile device 100 can wait until end location 258 is reached before determining whether generating second navigation data 260 is required, based on whether a new communication signal is detected at the end location 258 or at another location along the route to end location 258. With this embodiment, mobile device alerts the user of the loss of communication signal but allows the user to choose to simply proceed to the intended destination, without interrupting the navigation system. Once at the end location 258, mobile device 100 can then present "start route to service" icon 420 on display 130, and present map 452 and directions 454 on display 130 only in response to the user selecting the "start route to service" icon 420. Alternatively, in other embodiments, mobile device 100 can automatically initiate navigation along second route 262 back to cellular/WiFi service at first location 224 after end location 258 is reached.

According to another aspect of the disclosure, after detecting the loss of communication signals and when mobile device 100 detects, via GPS 160, that current location 232 is not on first route 254 (i.e., mobile device 100 has gone off route), mobile device 100 can generate second navigation data 260 for an alternate route (i.e., route 262') and present map 452 and directions 454 on display 130. Mobile device 100 can then present "start route to service" icon 420 on display 130. Alternatively, mobile device 100 can automatically initiate navigation along alternate route 262' back to cellular service at first location 224 after end location 258 is reached.

In one embodiment, processor 102, executing return to service module 136, detects a loss of a communication signal 194 from wireless network 150. Processor 102 triggers GPS device 160 to transmit signal loss location data 222 corresponding to a first location 224 where the communication signal 194 was lost. Processor 102 receives the signal loss location data 222 from the GPS device and retrieves, from system memory 120, first navigation data 252 and current location 232. Processor 102 generates second navigation data 260, based on first navigation data 252, current location 232, and signal loss location data 222. Processor 102 presents, on an output device such as display 130 of mobile device 100, second navigation data 260. The second navigation data 260 corresponds to a second route 262 between a current location 232 and a second location of expected coverage before the first location 224.

Figure 5:
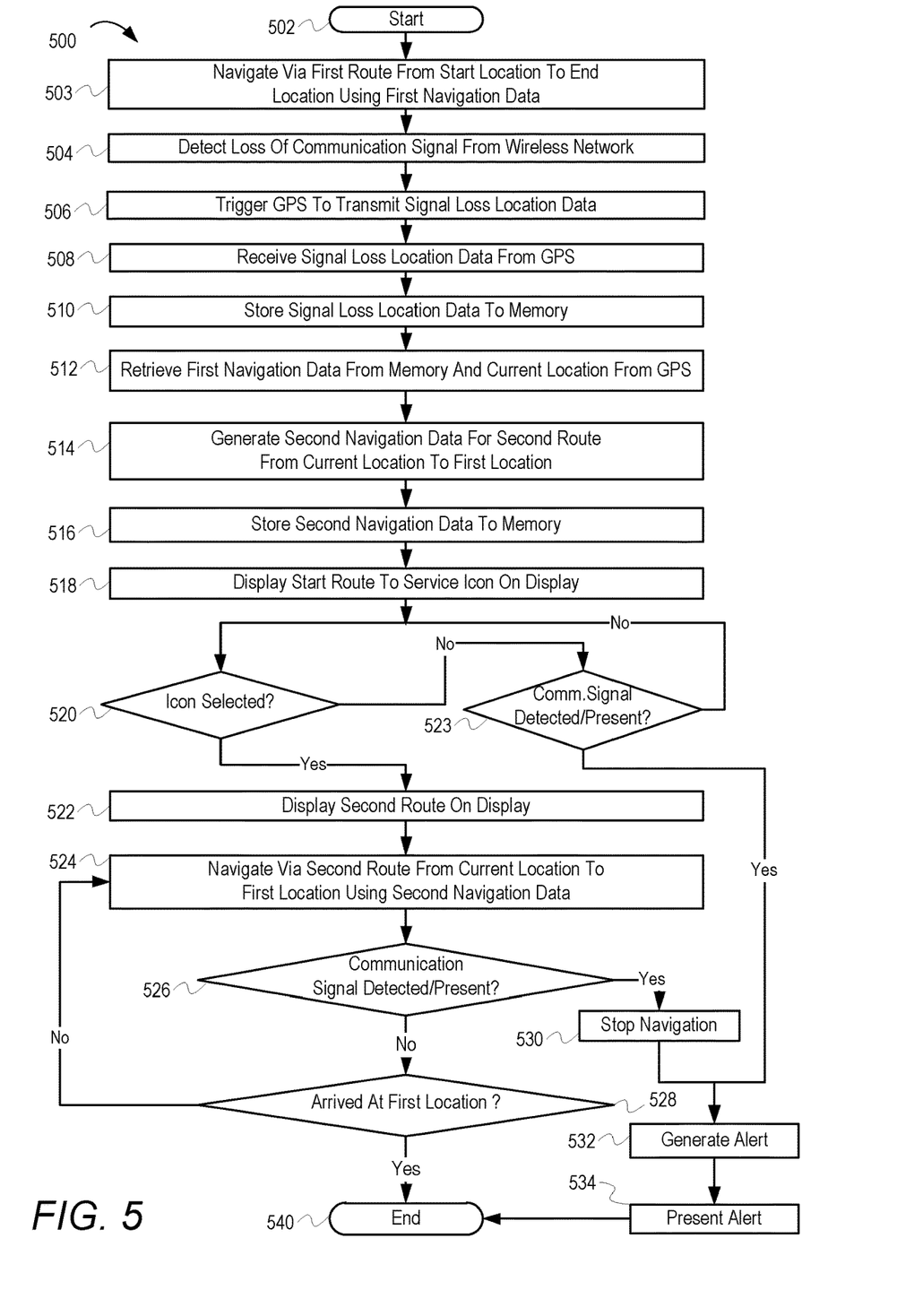
FIG. 5 depicts a flowchart of a method by which a mobile device navigation app autonomously provides directions for navigating to a past location along a route that has signal access for the mobile device to communicate with a wireless network, according to one or more embodiments.
Figure 6:
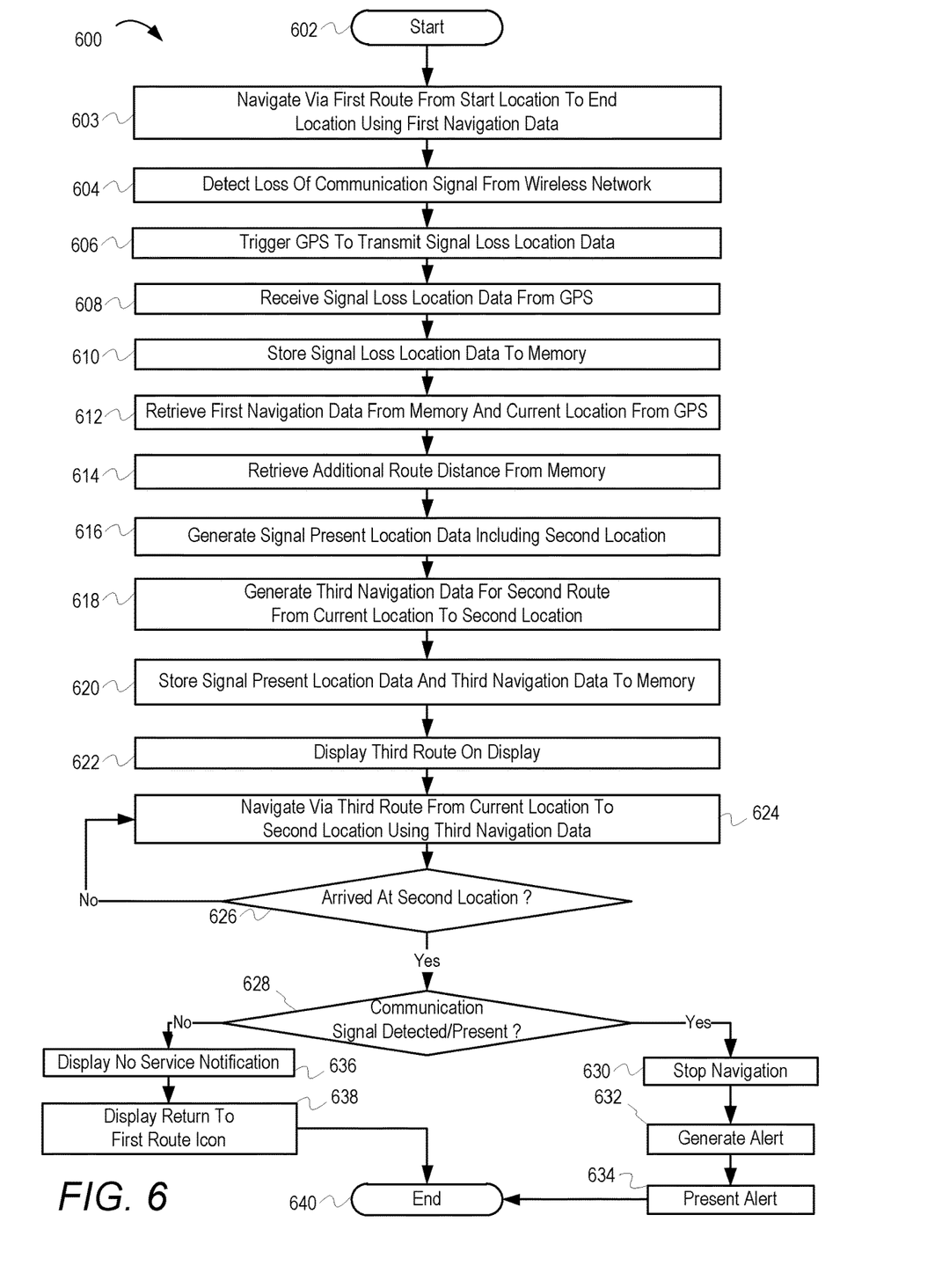
FIG. 6 depicts a flowchart of another method by which a mobile device navigation app autonomously provides directions for navigating to another past location along a route that has signal access for the mobile device to communicate with a wireless network, according to one or more embodiments.

FIGS. 5 and 6 depict methods 500 and 600 by which mobile device generates routes for navigating to a location with communication access to a wireless network after a communication signal has been lost during movement of the mobile device and/or a vehicle in which the mobile device is located. The description of methods 500 and 600 will be described with reference to the components and examples of FIGS. 1-4B. The operations depicted in FIGS. 5 and 6 can be performed by mobile device 100 or any suitable communication device that includes the one or more functional components of mobile device 100 that provide/enable the described features. One or more of the processes of the methods described in FIGS. 5 and 6 may be performed by processor 102 executing program code associated with return to service module 136 and map module 137.

With specific reference to FIG. 5, method 500 begins at the start block 502. At block 503, processor 102 navigates along the first route 254 using the first navigation data 252 between the start location 256 and end location 258. In one embodiment, start location 256 and end location 258 are provided by user as inputs to mobile device 100, and first route 254 is generated by mobile device 100 based on that user input. At block 504, processor 102 detects a loss of communication signals 194 from wireless network 150. In one embodiment, when communication signals 194 are lost, radios 142a-n can provide information to processor 102 that communications have been lost with at least one of devices 152a-n, such as a cellular site or cell tower 360. Processor 102 triggers GPS device 160 to transmit signal loss location data 222 corresponding to a first location 224 where the communication signals 194 were lost (block 506). Processor 102 receives the signal loss location data 222 from GPS device 160 (block 508). Processor 102 stores the signal loss location data 222 to system memory 120 (block 510).

Processor 102 retrieves first navigation data 252 from system memory 120 and retrieves current location 232 from GPS 160 (block 512). First navigation data 252 corresponds to a first route 254 between a starting location 256 and an end location 258. Processor 102 generates second navigation data 260 based on the first navigation data 252, current location 232, and the signal loss location data 222 (block 514). The second navigation data 260 corresponds to a second route 262 between current location 232 and first location 224. In one embodiment, second route 262 can be a reverse of first route 254 to navigate back into wireless communication service coverage area. Processor 102 stores second navigation data 260 to system memory 120 (block 516).

Processor 102 displays "start route to service" icon 420 on display 130 (block 518). Contemporaneously, processor 102 can provide an audio alert of the second route via other output devices, such as speaker 144. At decision block 520, processor 102 determines if the "start route to service" icon 420 has been selected by a user (e.g., via touch screen interface 131). In response to the "start route to service" icon 420 being selected, processor 102 presents or displays second navigation data 260 on display 130 (block 522). Displaying second navigation data 260 can include showing maps 452 with second route 262 and directions 454 on display 130.

In response to the "start route to service" icon 420 not being selected, processor 102 determines if communication signals 194 from wireless network 150 are present (block 523). In response to communication signals 194 from wireless network 150 not being present, processor 102 continues to determine if the "start route to service" icon 420 has been selected by a user (decision block 520). In response to communication signals 194 from wireless network 150 being present, processor 102 generates service available alert 272 (block 532) and presents the alert 272 on an output device (i.e., display 130 or speaker 144) of mobile device 100 (block 534). Method 500 then ends at end block 540.

After block 522, processor 102 navigates along the second route 262 using the second navigation data 260 from the current location 232 back to a location where cellular service was last available (block 524). At decision block 526, processor 102 determines if communication signals 194 from wireless network 150 are present. Communication signals 194 from wireless network 150 can be present if mobile device 100 travels back into/within cellular service coverage area 322.

In response to communication signals 194 from wireless network 150 being present, processor 102 stops navigation along second route 262 (block 530). Stopping navigation along second route 262 can include discontinuing the display of maps 452 and directions 454 on display 130 and discontinuing any audio associated with directions 454. Processor 102 generates service available alert 272 (block 532) and presents the alert 272 on an output device (i.e., display 130 or speaker 144) of mobile device 100 (block 534). Service available alert 272 is a visual/audio notification that mobile device 100 has re-entered a location having wireless communication service. After wireless communication service has been lost and mobile device 100 travels or returns back into an area having wireless communication service, service available alert 272 indicates to a user of mobile device 100 that wireless communication service is now available. The alert can be a visual alert via display 130 or an audio alert via speaker 144. Method 500 then ends at end block 540.

In response to communication signals 194 from wireless network 150 not being present, processor 102 determines if mobile device 100 has arrived at the first location 224 (decision block 528). Processor 102 can compare the current location 232 to the first location 224. If the current location 232 matches the first location 224, mobile device 100 is at the first location 224. In response to mobile device 100 being at first location 224, method 500 terminates at end block 540. In response to mobile device 100 not being at first location 224, processor 102 continues to navigate along the second route 262 using the second navigation data 260 from the current location 232 back to the first location 224 (block 524).

Mobile device 100 can use stored first location 224 to enable navigation from null coverage area 324 back into cellular/WiFi service/coverage area 322. Mobile device 100 can generate second route 262 from current location 232 to first location 224 where cellular service or coverage is available and display the second route 262 on display 130. A user of mobile device 100 can follow second route 262 in order to return to cellular service coverage area 322. In one embodiment, second route 262 can be at least partially a reverse of first route 254.

In an alternative embodiment, instead of triggering GPS device 160 to transmit the signal loss location data 222, at block 506, processor 102 can retrieve network location 259 from system memory 120 and use network location 259 to generate second navigation data 260. Network location 259 corresponds to a known last location where communication signals 194 from wireless network 150 were available or where mobile device 100 was in an area with cellular service. Wireless network 150 can determine the location (i.e., network location 259) of mobile device 100 using various geo-location techniques and can transmit network location 259 to mobile device 100. In one embodiment, network location 259 can be determined by various cellular network techniques, such as triangulation, and be periodically transmitted and stored to mobile device 100.

FIG. 6 illustrates another method 600 by which mobile device 100 generates routes for navigating to a location with communications to a wireless network. With specific reference to FIG. 6, method 600 begins at the start block 602. At block 603, processor 102 navigates along the first route 254 using the first navigation data 252 between the start location 256 and end location 258. In one embodiment, start location 256 and end location 258 are provided by user as inputs to mobile device 100, and first route 254 is generated by mobile device 100. At block 604, processor 102 detects a loss of communication signals 194 from wireless network 150. In one embodiment, when communication signals 194 are lost, radios 142a-n can provide information to processor 102 that communications have been lost with at least one of devices 152a-n such as cellular site or cell tower 360. Processor 102 triggers GPS device 160 to transmit signal loss location data 222 corresponding to a first location 224 where the communication signals 194 were lost (block 606). Processor 102 receives the signal loss location data 222 from GPS device 160 (block 608). Processor 102 stores the signal loss location data 222 to system memory 120 (block 610).

Processor 102 retrieves from system memory 120 first navigation data 252 and retrieves current location 232 from GPS 160 (block 612). First navigation data 252 corresponds to a first route 254 between starting location 256 and end location 258. Processor 102 retrieves from system memory 120 additional route distance 270 (block 614). The additional route distance 270 represents an extra distance toward start location 256 that provides for mobile device 100 to be located within wireless communication coverage area 322. Processor 102 generates signal present location data 226 including second location 228 based on signal loss location data 222 and additional route distance 270 (block 616). Second location 228 is located within wireless communication service coverage area 322 and is a location where communication signals 194 should be present. Mobile device 100 can calculate the position of second location 228 by adding additional route distance 270 to first location 224 along first route 254 towards start location 256. Alternatively, the calculation of second location 228 can be described as being performed by subtracting additional route distance 270 from first location 224 along first route 254. Second location 228 is between start location 256 and first location 224.

Processor 102 generates third navigation data 264 based on the first navigation data 252, current location 232, and signal present location data 226 (block 618). The third navigation data 264 corresponds to a third route 266 between current location 232 and second location 228. In one embodiment, third route 266 can be a reverse of first route 254 to navigate back into cellular service. Processor 102 stores signal present location data 226 and third navigation data 264 to system memory 120 (block 620).

Processor 102 presents or displays third navigation data 264 on display 130 (block 622). Displaying third navigation data 264 can include showing maps 452 with third route 266 and directions 454 on display 130. In response to detected movement, processor 102 automatically triggers navigation updates along the third route 266 using the third navigation data 264, from the current location 232 to the second location 228 where cellular/WiFi service should be available (block 624).

At decision block 626, processor 102 determines if mobile device 100 has arrived at the second location 228. Processor 102 can compare the current location 232 to the second location 228. If the current location 232 matches the second location 228, mobile device 100 is at the second location 228. In response to mobile device 100 not being at second location 228, processor 102 continues to navigate along the third route 266 using the third navigation data 264 from the current location 232 to the second location 228 (block 624). In response to mobile device 100 being at second location 228, processor 102 determines if communication signals 194 from wireless network 150 are present (decision block 628). Communication signals 194 from wireless network 150 can be present if mobile device 100 travels back into/within a wireless communication service coverage area 322. In response to communication signals 194 from wireless network 150 being present, processor 102 stops navigation along second route 262 (block 630). Stopping navigation along second route 262 can include discontinuing the display of maps 452 and directions 454 on display 130 and discontinuing any audio associated with directions 454. Processor 102 generates service available alert 272, which indicates that wireless communication service is available (block 632) and presents service available alert 272 on an output device (i.e., display 130 or speaker 144) of mobile device 100 (block 634). The alert can be a visual alert via display 130 or an audio alert via speaker 144. Method 600 then ends at end block 640.

In response to communication signals 194 from wireless network 150 not being present, processor 102 displays a "no service notification" that wireless communication service is not available at the second location 228 (block 636). The "no service notification" can be a visual notification via display 130 or an audio notification via speaker 144. Processor 102 displays a return to first route icon on display 130 (block 638). Mobile device 100 can display return to first route icon to allow a user to exit navigation from the second location 228 (via third route 266) and to return to navigation along first route 254 towards end location 258. Method 600 then terminates at end block 640.

Mobile device 100 can use second location 228 to enable navigation from null coverage area 324 back into wireless communication service coverage area 322. Mobile device 100 can generate third route 266 from current location 232 to second location 228 where cellular service or coverage is available and display the third route 266 on display 130. A user of mobile device 100 can follow third route 266 in order to return to cellular service or coverage area 322. In one embodiment, third route 266 can be at least partially a reverse of first route 254.

In an alternative embodiment, instead of triggering GPS device 160 to transmit the signal loss location data 222, at block 606, processor 102 can retrieve network location 259 from system memory 120, and use network location 259 to generate third navigation data 264. Network location 259 corresponds to a known last location where communication signals 194 from wireless network 150 were available or where mobile device 100 was in an area with cellular service.

In the above-described methods of FIGS. 5 and 6, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   detecting, via a processor of a communication device, a loss of a first communication signal from a wireless network;
   receiving signal loss location data corresponding to a first location where the first communication signal from the wireless network was lost;
   retrieving, from memory within the communication device, first navigation data corresponding to a first route between a starting location and an end location; and
   generating and presenting, on an output device of the communication device, second navigation data based on the first navigation data and the signal loss location data, the second navigation data corresponding to a second route between a current location and a second location that is an additional route distance past the first location towards a start location.

2. The method of claim 1, wherein generating the second navigation data comprises reversing the first route between the current location and the first second location.

3. The method of claim 1, further comprising:
   displaying the second navigation data corresponding to the second route on a display of the communication device; and
   automatically navigating along the second route using the second navigation data.

4. The method of claim 1, further comprising:
   displaying, on a display of the communication device, a start route to service icon enabling selection of the second route;
   determining if a user has selected the start route to service icon; and
   in response to determining that the user has selected the start route to service icon, navigating along the second route using the second navigation data.

5. The method of claim 1, further comprising:
   determining if a communication signal from the wireless network is present;
   in response to determining that the communication signal is present, stopping navigation along the second route;
   generating an alert that the communication signal is present; and
   presenting the alert on the output device.

6. The method of claim 1, wherein generating the second navigation data further comprises:
   retrieving, from the memory of the communication device, the additional route distance, which is stored in the memory;
   generating, based on the signal loss location data and the additional route distance, signal present location data that corresponds to the second location where the first communication signal is present; and generating the second navigation data based on the first navigation data and the signal present location data, the second navigation data corresponding to the second route between the current location and the second location.

7. The method of claim 6, wherein generating the second navigation data comprises reversing the first route between the current location and the second location.

8. A communication device comprising:
a global positioning device;
a display;
memory having stored thereon a map module and a return to service module for navigating to a location with communication signals to a wireless network; and
one or more processors communicatively coupled to the global positioning device, the display and the memory, the one or more processors executing program code of the map module and the return to service module, which enables the communication device to:
detect a loss of a first communication signal from the wireless network;
receive signal loss location data, the signal loss location data corresponding to a first location where the first communication signal from the wireless network was lost;
retrieve from the memory first navigation data corresponding to a first route between a starting location and an end location; and
generate and present second navigation data based on the first navigation data and the signal loss location data, the second navigation data corresponding to a second route between a current location and a second location that is an additional route distance past the first location towards a start location.

9. The communication device of claim 8, wherein generating the second navigation data comprises reversing the first route between the current location and the second location.

10. The communication device of claim 8, wherein the one or more processors are further enabled to:
display the second navigation data corresponding to the second route on the display of the communication device; and
automatically navigate along the second route using the second navigation data.

11. The communication device of claim 8, wherein the one or more processors are further enabled to:
display on the display a start route to service icon enabling selection of the second route;
determine if a user has selected the start route to service icon; and
in response to determining that the user has selected the start route to service icon, navigate along the second route using the second navigation data.

12. The communication device of claim 8, wherein the one or more processors are further enabled to:
determine if the first communication signal from the wireless network is present;
in response to determining that the first communication signal is present, stop navigation along the second route;
generate an alert that the first communication signal is present; and
present the alert via an output device.

13. The communication device of claim 8, wherein to generate the second navigation data, the one or more processors are further enabled to:
retrieve, from the memory of the communication device, the additional route distance, which is stored in the memory;
generate based on the signal loss location data and the additional route distance, signal present data corresponding to the second location where the first communication signal is present; and
generate the second navigation data based on the first navigation data and the signal present location data, the second navigation data corresponding to a second route between the current location and the second location.

14. The communication device of claim 13, wherein generating the second navigation data comprises reversing the first route between the current location and the second location.

15. A computer program product comprising:
a non-transitory computer readable storage device having stored thereon program code which, when executed by one or more processors of a communication device having a global positioning system device, a display and memory enables the communication device to complete the functionality of:
detecting a loss of a first communication signal from a wireless network;
receiving signal loss location data corresponding to a first location where the first communication signal from the wireless network was lost;
retrieving, from the memory, first navigation data corresponding to a first route between a starting location and an end location; and
generating and presenting second navigation data based on the first navigation data and the signal loss location data, the second navigation data corresponding to a second route between a current location and a second location that is an additional route distance past the first location towards a start location.

16. The computer program product of claim 15, wherein generating the second navigation data comprises reversing the first route between the current location and the second location.

17. The computer program product of claim 15, wherein the program code for navigating the communication device to a location with communications to a wireless network comprises program code that further enables the communication device to complete the functionality of:
displaying the second navigation data corresponding to the second route on the display of the communication device; and
automatically navigating along the second route using the second navigation data.

18. The computer program product of claim 15, wherein the program code for navigating the communication device to a location with communications to a wireless network comprises program code that further enables the communication device to complete the functionality of:
displaying on the display a start route to service icon enabling selection of the second route;
determining if a user has selected the start route to service icon; and
in response to determining that the user has selected the start route to service icon, navigating along the second route using the second navigation data.

19. The computer program product of claim 18, wherein the program code for navigating the communication device to a location with communications to a wireless network comprises program code that further enables the communication device to complete the functionality of:
- determining if the first communication signal from the wireless network is present;
- in response to determining that the first communication signal is present, stopping navigation along the second route;
- generating an alert that the first communication signal is present; and
- presenting the alert via an output device.

20. The computer program product of claim 15, wherein the program code for generating the second navigation data comprises program code that further enables the communication device to complete the functionality of:
- retrieving, from the memory of the communication device, the additional route distance, which is stored in the memory;
- generating based on the signal loss location data and the additional route distance, signal present data corresponding to the second location where the first communication signal is present; and
- generating the second navigation data based on the first navigation data and the signal present location data, the second navigation data corresponding to the second route between the current location and the second location.

* * * * *